United States Patent Office 2,874,071
Patented Feb. 17, 1959

2,874,071

REFRACTORY BODY RESISTANT TO THERMAL SHOCK

Gerhard E. Kadisch, Watchung, N. J., and Joseph M. Katz, Brooklyn, N. Y., assignors to Steatite Research Corporation, Keasbey, N. J., a corporation of Delaware No Drawing. Application September 12, 1952
Serial No. 309,360

3 Claims. (Cl. 117—123)

This invention relates to a refractory body which is resistant to thermal shock and which can be formed to shape and set by a cold setting process.

Among the objects of this invention is to provide a molding composition which may be set by a cold setting process and which has a low thermal expansion, low conductivity and is extremely thermal-shock resistant.

Among other objects of the invention is to provide a refractory composition suitable for high temperature equipment such as rocket nozzles, turbine blades, etc., which composition does not require a firing treatment prior to the time it is put into use.

These objects and others ancillary thereto are obtained by binding particles of fused silica with a cement which consists essentially of a calcium aluminate. A special method has been developed for producing the bond in this composition. The powdered silica and calcium aluminate are first moistened with water to form a dry paste. In this step the water acts primarily as a lubricant and only partially hydrolyzes the cement. The paste is then formed to shape as by pressing, extruding or otherwise molding it to obtain the shape and density required. The resultant products must be carefully handled but are then partially set by treating with an excess of water as by keeping them damp for a period of at least 10 hours or conveniently, overnight. This moistening step may be carried out by any method such as by placing in a moist atmosphere, by wrapping with damp rags, etc.

The fused silica powder is made by fusing ordinary silica and thereafter cooling and grinding to a powder. The powder should be of a size as to pass through a 6 mesh screen. For some uses a relatively coarse grain refractory powder is advantageous, for other uses a fine-grained powder is advantageous.

The idea of setting refractory powders with Portland cement is known and although Portland cement contains some calcium aluminate the processes and products obtained with Portland cement are quite different from the products obtained with applicants' composition. Portland cement compositions reach 90% of their maximum hardness in 24 hours and their maximum hardness after about one year. Calcium aluminate compositions do not achieve any significant hardness after several hours from the time of fabrication but significant hardness is attained by being kept moist overnight. After immersion in water for about 24 hours or more substantially the maximum strength is attained. A refractory made with Portland cement is capable of withstanding a temperature of only about 1800° F. whereas the refractory of the present invention is capable of withstanding a temperature of 3000° F. or more.

It will be realized that many calcium aluminates are known and reported in the literature. Calcium oxide and alumina do not produce calcium aluminates when mixed cold or when mixed with fused silica and immersed in water. Calcium aluminates are produced by heating the proper proportions of lime and alumina to a very high temperature. The resultant product is cementitious and will set under water; it is ground to desired fineness before use. Since the calcium aluminates and the ingredients forming them are so well known in the literature the term "calcium aluminate" as used in the specification and claims relating to this invention will be understood to include all such calcium aluminates and mixtures thereof.

According to another phase of the invention the material may be made much more refractory by an additional treatment involving dipping, spraying or brushing the surface thereof with a plastic composition containing super-refractory powders or mixtures of such powders. Because of the inherent porosity of the base material an excellent bond is formed with the super-refractory powders without any additional treatment. The treatment also decreases the porosity of the basic product of the invention.

Plastic compositions containing super-refractory powders are known and are made by specially milling stabilized fused zirconium or alumina. The powder obtained is freed from residual iron, by treatment with acid for example, and treated with water to form a plastic suspension. This suspension is applied to the product by dipping, spraying, brushing, etc. The added super-refractory body may be applied in a wide range of thickness from 0.005" to 0.1" for example. Refractory borides, nitrides, or carbides and mixtures thereof, (for example of silicon, molybdenum and chromium) can also be applied as a coating.

It is found that due to dehydration the products of the present invention may lose up to 1/6 of their strength after being subjected for the first time to the heat of the heated body, for example, into which they are built. In applications such as rocket nozzles, service is only once at a very high temperature and strength is relatively unimportant. But where strength is important and the product is to be used again and again, a vitrifiable material may be included. For example, where this loss of strength would be serious 2–8% of a powdered vitrifiable material may be added to the composition so that during this first heat treatment the vitrification of this material occurs to compensate for the loss of strength of the calcium aluminate bonds. The overall composition, on the dry basis, therefore is,

| | Percent |
|---|---|
| Fused silica | 50–95 |
| Calcium aluminates | 50–5 |
| Vitrifiable material | 0–8 |

All proportions in this specification and claims are by weight unless otherwise specified.

To the products prepared from such compositions a super-refractory coating of 0.005" to 0.1" thickness may be applied.

Examples of vitrifiable material that may be added include glaze, feldspar, clay, etc. These materials should vitrify slightly below the ordinary operating temperature of the refractory body into which the composition is incorporated.

The invention both as to its organization and its method of operation together with additional objects and advantages thereof will best be understood from the following description of specific embodiments thereof.

Example 1

80 parts by weight of fused silica powder having a variable size of grains, all of which is capable of passing a 6 mesh screen, are mixed with 20 parts of calcium aluminate and sufficient water to form a dry paste. The paste is transferred to a mold having the form of the lining of a rocket nozzle and is thereafter compacted by vibrating the mold. The resultant nozzle lining is removed from the mold and wrapped in damp rags and stored in this condition overnight. The resultant aged product is them immersed in water for a period of 48 hours. This nozzle lining is capable of withstanding temperatures of approximately 3300° F., has a low expansion at that temperature and is unattacked by the hot gasses of the exhaust of a rocket engine.

*Example 2*

80 parts by weight of fused silica consisting of 50% retained on 80 mesh and 50% passing through 80 mesh, are mixed with 20 parts of calcium aluminate and a minimum of water to form a dry paste. The paste is tamped into a mold and the mold placed in a moist atmosphere overnight. After the resultant product is drawn from the mold, it is then immersed in water for a period of 48 hours. After final set the product is oven dried. Where gasing from the dehydration of the calcium aluminate is objectionable, the product is prefired. The product, fired or unfired, can be coated with a super refractory, as indicated in Example 3 (below).

*Example 3*

Zirconia or alumina which is fused and ground is obtainable commercially. This powder is suspended in water to provide a slip of the consistency of 1.5–2.0 specific gravity.

A product such as made in Example 1 is sprayed with the thus prepared plastic composition and allowed to dry. The resultant product is extremely resistant to thermal shock and is capable of withstanding temperatures of over 4000° F. for short periods of time.

The features and principles underlying the invention described above in connection with specific exemplifications will suggest to those skilled in the art many other modifications thereof. It is accordingly desired that the appended claims shall not be limited to any specific features or details described in connection with the exemplifications thereof.

We claim:

1. As an article of manufacture a body of refractory material, said refractory material consisting essentially of, on the dry basis, 50–95% of particles of fused silica, 50 to 5% of calcium aluminates, 0–8% of vitrifiable material and a coating of a super refractory filler.

2. As an article of manufacture a body of refractory material, said refractory material consisting essentially of, on the dry basis, 50–95% of particles of fused silica and 50–5% of calcium aluminates.

3. As an article of manufacture a body of refractory material, said refractory material consisting essentially of, on the dry basis, 50–95% of particles of fused silica and 50–5% of calcium aluminates, said body containg a coating of a super refractory composition consisting essentially of a material selected from the group consisting of alumina, zirconia, refractory borides, nitrides, and carbides and mixtures thereof.

References Cited in the file of this patent

UNITED STATES PATENTS

| 447,972 | Ransome | Mar. 10, 1891 |
| 1,374,403 | Smith | Apr. 12, 1921 |
| 1,554,225 | Marden et al. | Sept. 22, 1925 |
| 1,969,751 | Heuer | Aug. 14, 1934 |
| 2,017,723 | McKinley et al. | Oct. 15, 1935 |
| 2,516,892 | Lobaugh | Aug. 1, 1950 |

FOREIGN PATENTS

| 773,709 | Great Britain | Nov. 1, 1904 |

OTHER REFERENCES

"The Chemistry of Cement and Concrete," by Lea and Desch, 1935; publisher, Edward Arnold & Co., London, page 77. (Copy in Div. 3.)

"The Chemistry of Cement and Concrete," by Lea and Desch, 1935; publisher, Edward Arnold and Co., London, pages 229 and 230. (Copy in Div. 56.)